(12) United States Patent
Nicholson et al.

(10) Patent No.: US 11,178,280 B2
(45) Date of Patent: Nov. 16, 2021

(54) INPUT DURING CONVERSATIONAL SESSION

(71) Applicant: Lenovo (Singapore) Pte. Ltd., Singapore (SG)

(72) Inventors: John Weldon Nicholson, Cary, NC (US); Daryl Cromer, Cary, NC (US); Ming Qian, Cary, NC (US); Song Wang, Cary, NC (US); David Alexander Schwarz, Morrisville, NC (US); Aaron Michael Stewart, Raleigh, NC (US); Lincoln Penn Hancock, Raleigh, NC (US); Jonathan Jen-Wei Yu, Raleigh, NC (US); Jeffrey E. Skinner, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 223 days.

(21) Appl. No.: 15/628,080

(22) Filed: Jun. 20, 2017

(65) Prior Publication Data
US 2018/0367669 A1 Dec. 20, 2018

(51) Int. Cl.
*G06F 15/16* (2006.01)
*H04M 3/493* (2006.01)
*G10L 15/22* (2006.01)
*G06F 3/16* (2006.01)
*G06F 9/48* (2006.01)

(52) U.S. Cl.
CPC .......... *H04M 3/4936* (2013.01); *G06F 3/167* (2013.01); *G10L 15/222* (2013.01); *G06F 9/4812* (2013.01); *G10L 15/22* (2013.01); *G10L 2015/223* (2013.01); *H04M 2203/2027* (2013.01)

(58) Field of Classification Search
CPC ........ H04M 3/00; G06F 3/167; G06F 17/271; G10L 15/222; G10L 15/22; G10L 13/043; G10L 15/265; H04L 67/26
USPC ................ 709/206, 217, 204, 203, 205, 226
See application file for complete search history.

(56) References Cited

U.S. PATENT DOCUMENTS

| | | | |
|---|---|---|---|
| 10,170,116 B1* | 1/2019 | Kelly | G06F 3/167 |
| 2004/0243281 A1* | 12/2004 | Fujita | B25J 9/1602 |
| | | | 700/245 |
| 2006/0036688 A1 | 2/2006 | McMahan et al. | |
| 2012/0161971 A1* | 6/2012 | Nasir | G07C 1/10 |
| | | | 340/573.4 |
| 2015/0099587 A1* | 4/2015 | Lees | A63F 13/33 |
| | | | 463/42 |

(Continued)

FOREIGN PATENT DOCUMENTS

| CN | 1655233 A | 8/2005 |
|---|---|---|
| CN | 102054481 A | 5/2011 |

(Continued)

*Primary Examiner* — Kaylee J Huang
(74) *Attorney, Agent, or Firm* — Ference & Associates LLC

(57) ABSTRACT

One embodiment provides a method, including: engaging, at an information handing device, in a conversational session with a user; receiving an input from a source other than the user during the conversational session; and performing, at the information handling device, an action related to the conversational input in response to the received input. Other aspects are described and claimed.

15 Claims, 3 Drawing Sheets

(56) References Cited

U.S. PATENT DOCUMENTS

| | | | | |
|---|---|---|---|---|
| 2015/0213800 | A1* | 7/2015 | Krishnan | H04M 3/4936 |
| | | | | 704/246 |
| 2015/0302867 | A1* | 10/2015 | Tomlin | G10L 25/78 |
| | | | | 704/270 |
| 2017/0289766 | A1* | 10/2017 | Scott | H04W 4/023 |
| 2017/0358302 | A1* | 12/2017 | Orr | G10L 15/1815 |
| 2018/0074785 | A1* | 3/2018 | Ohmura | G06F 3/0487 |
| 2018/0190264 | A1* | 7/2018 | Mixter | H04L 12/282 |
| 2018/0233139 | A1* | 8/2018 | Finkelstein | G07C 9/00111 |
| 2018/0336904 | A1* | 11/2018 | Piercy | G10L 17/22 |

FOREIGN PATENT DOCUMENTS

| | | |
|---|---|---|
| CN | 102945672 A | 2/2013 |
| CN | 105264524 A | 1/2016 |
| EP | 3005650 A1 | 4/2016 |
| WO | 2011133249 A1 | 10/2011 |

* cited by examiner

INPUT DURING CONVERSATIONAL SESSION

BACKGROUND

Information handling devices ("devices"), for example smart phones, tablet devices, smart speakers, laptop and personal computers, and the like, may be capable of receiving command inputs and providing outputs responsive to the inputs. Generally, a user interacts with a voice input module, for example embodied in a personal assistant through use of natural language. This style of interface allows a device to receive voice inputs from a user (e.g., queries, commands, etc.), process those inputs, and provide output responsive to the input.

BRIEF SUMMARY

In summary, one aspect provides a method, comprising: engaging, at an information handing device, in a conversational session with a user; receiving an input from a source other than the user during the conversational session; and performing, at the information handling device, an action related to the conversational session in response to the received input.

Another aspect provides an information handling device, comprising: a processor; a memory device that stores instructions executable by the processor to: engage, at an information handing device, in a conversational session with a user; receive an input from a source other than the user during the conversational session; and perform, at the information handling device, an action related to the conversational session in response to the received input.

A further aspect provides a product, comprising: a storage device that stores code, the code being executable by a processor and comprising: code that engages in a conversational session with a user; code that receives an input from a source other than the user during the conversational session; and code that performs an action related to the conversational session in response to the received input.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
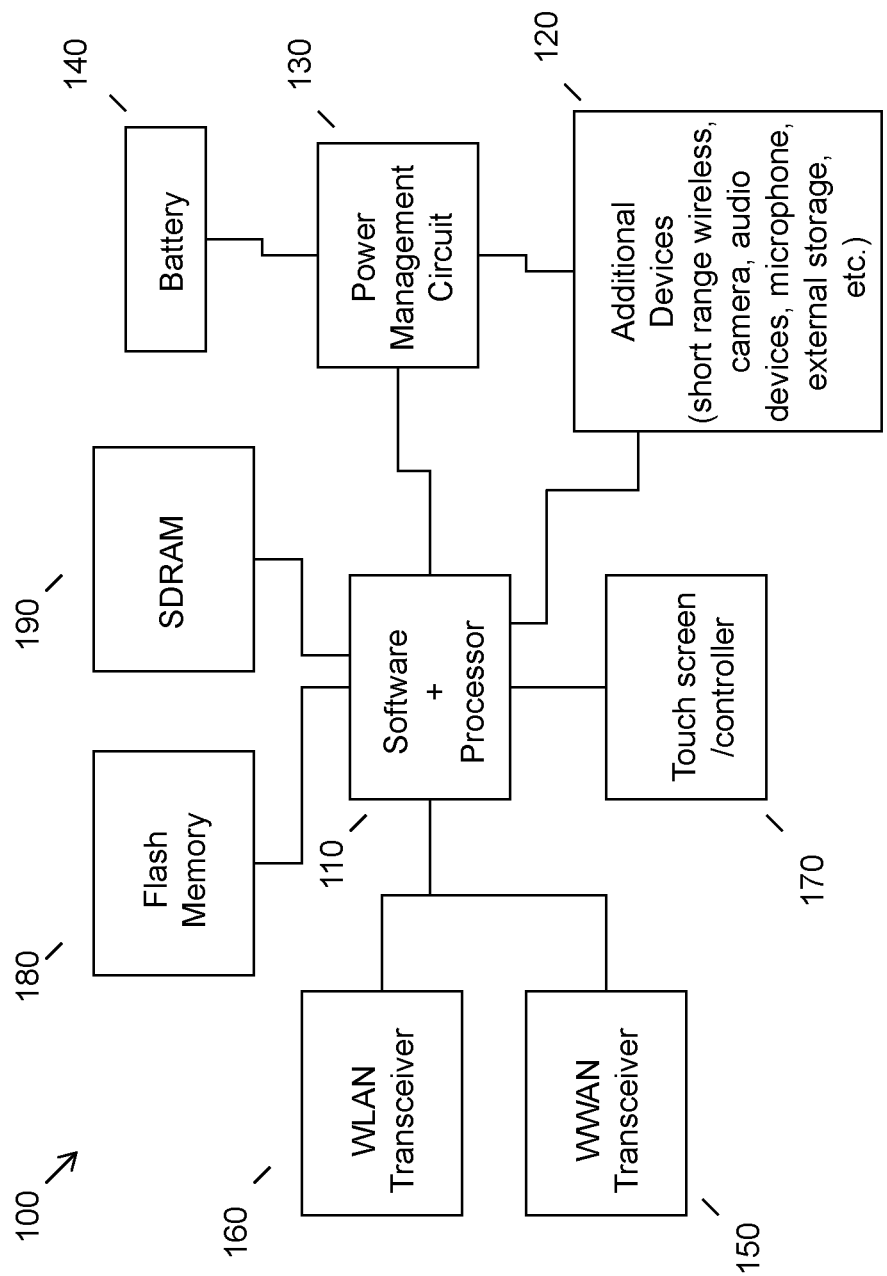
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Users frequently utilize devices to execute a variety of different commands or queries. One method of interacting with a device is to use digital assistant software employed on the device (e.g., Siri® for Apple®, Cortana® for Windows®, Alexa® for Amazon®, etc.). Digital assistants are able to provide outputs (e.g., audible outputs, visual outputs, etc.) that are responsive to a variety of different types of user inputs (e.g., voice inputs, etc.).

For ease of readability, the exchanges between a user and the digital assistant will be referred to herein as a conversational session. A conversational session may include a single exchange, referred to herein as a single-turn conversation, where the user provides an input to the device and the device performs the action. In other words, in a single-turn conversation, the device can process and complete the function associated with the input with only a single request or input from the user. As an example of a single-turn conversation, the user may ask "What song is currently playing?" The assistant can provide the response to the question without any additional information from the user.

Alternatively, the conversational session may include multiple exchanges, referred to herein as a multi-turn conversation, where the user provides an input to the device, the device provides an output requiring additional user input, the user provides the additional input, and so on until the exchange is complete. In other words, in a multi-turn conversation, the device requires additional user input in order to process and complete the function associated with the initial input received from the user. As an example, the user may provide the command "Order pizza." The device then needs to ask questions in response to the command in order to completely fulfill the command, for example, the device may ask "where did you want to order the pizza from?", "what size pizza did you want to order?", "what kinds of toppings do you want on your pizza?", and the like.

In conventional systems once the conversational session has been started, the device will not recognize inputs or interruptions either associated with the user or with the device. For example, if a user is providing input to the device and someone else walks in the room and asks a question of the user, the digital assistant will attempt to process both the input received by the user and the additional input provided by the additional person. This not only results in non-responsive output by the digital assistant, but also causes the user to have to correct the assistant and provide the input again, which can be inconvenient, non-intuitive, and confusing. First, the device is unable to determine that in interruption has occurred. In other words, the device is unable to determine that the received input was not actually directed at the device. Additionally, the device is unable to process an interruption in a human-like way, for example, recognizing the interruption and determining that the interrupting input is not directed at the assistant.

Accordingly, an embodiment provides a method for recognizing and responding to an input received from a source other than the user during a conversational session. An embodiment may engage in a conversational session with a user. An embodiment may then receive an input from a source other than the user during the conversational session. For example, an embodiment may detect an interruption of the conversational session by another person or other source. In one embodiment detecting the interruption may include identifying that another person has entered the room. Detecting the interruption may also include determining that input was received from another user in the room. For example, an embodiment may use natural language processing and understanding to determine that the input is unrelated to the conversational session. Upon detection of an interruption an embodiment may perform some action related to the conversational session in response to the received input. For example, an embodiment may pause the conversational session, lower the volume of output, save the conversational session, and the like. Such a method assists a user in conducting a more human-like conversation with the assistant by allowing the device to recognize and respond to interruptions in a manner that is similar to how people would recognize and respond to interruptions.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes a touch screen 170 for data input and display/rendering. System 100 also typically includes various memory devices, for example flash memory 180 and SDRAM 190.

Figure 2:
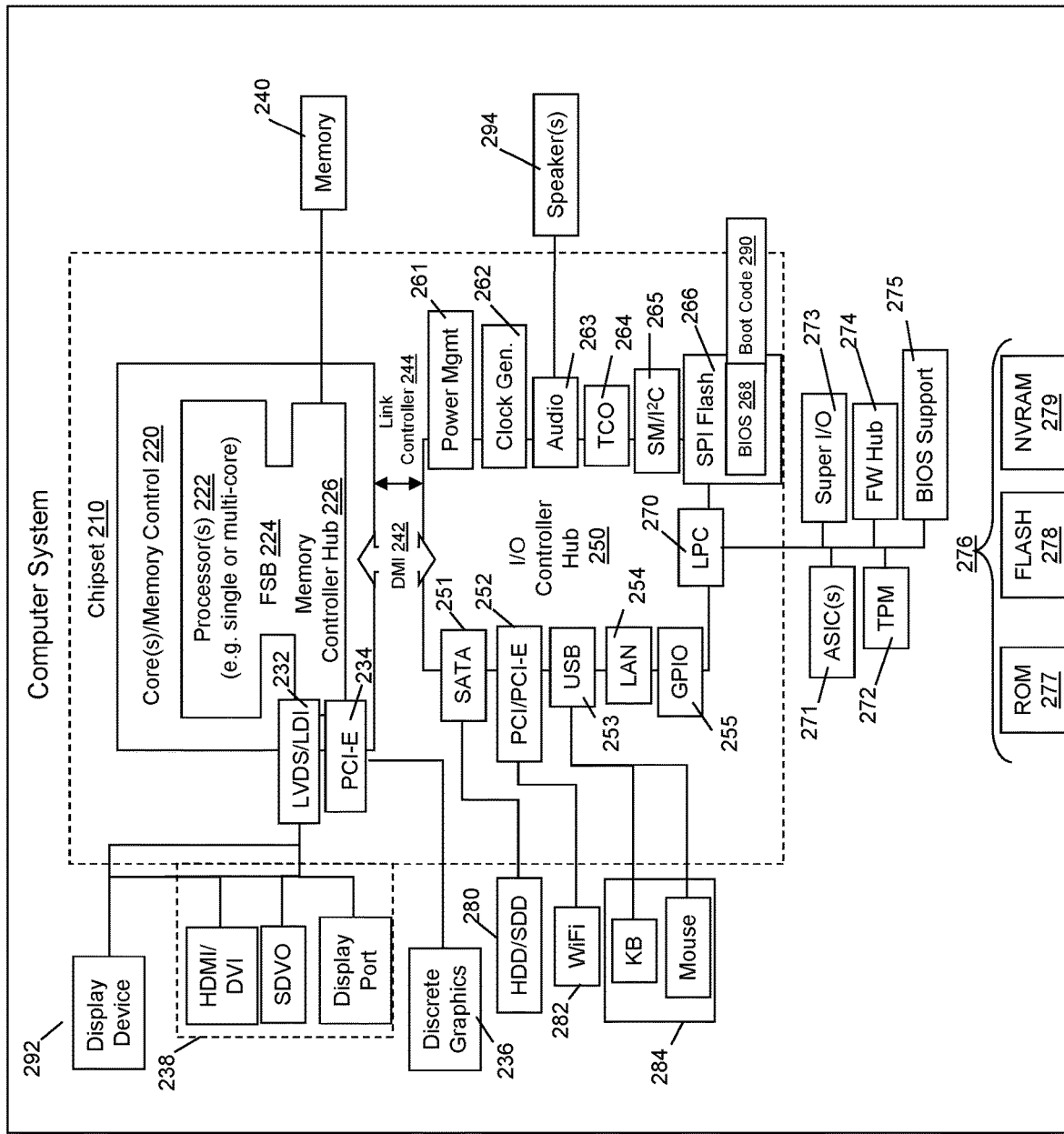
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, smart speakers, personal computer devices generally, and/or electronic devices which may include digital assistants that a user may interact with and that may perform various functions responsive to receiving user input. For example, the circuitry outlined in FIG. 1 may be implemented in a tablet or smart phone embodiment, whereas the circuitry outlined in FIG. 2 may be implemented in a personal computer embodiment.

Figure 3:
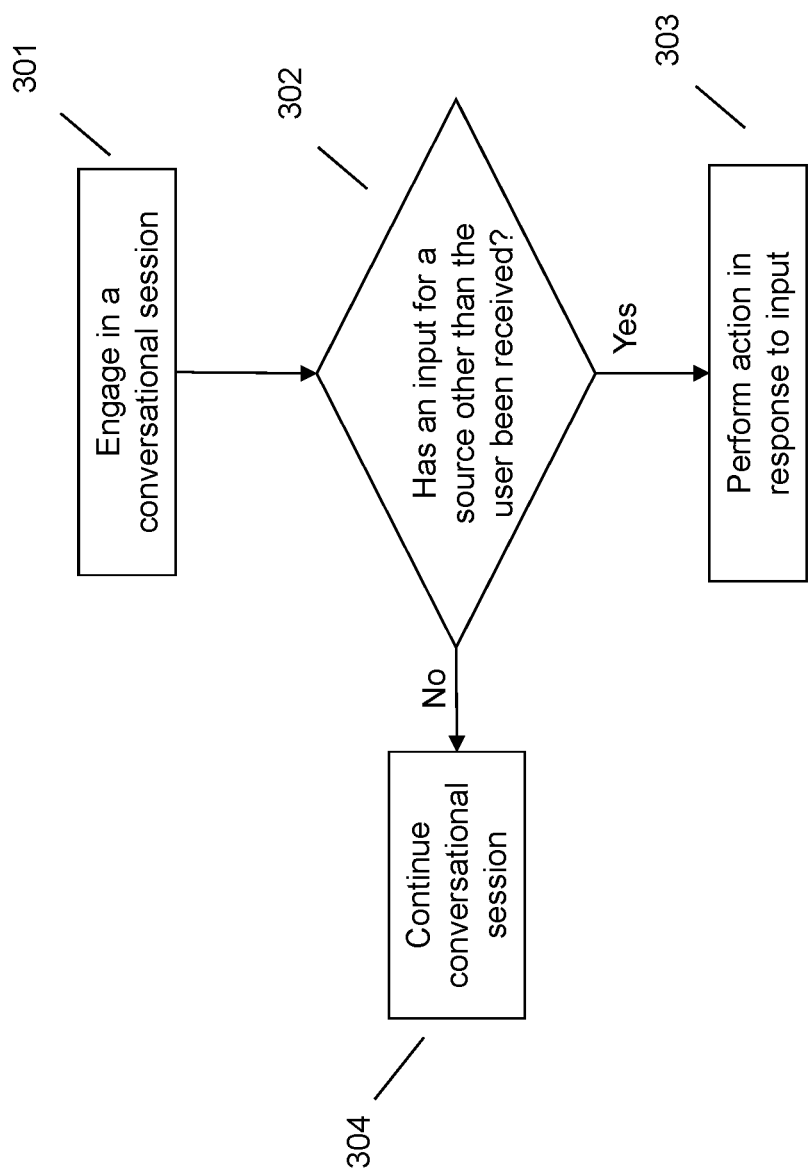
FIG. 3 illustrates an example method of recognizing and responding to an input received during a conversational session.

Referring now to FIG. 3, at 301, an embodiment may engage in a conversational session with a user. A conversational session may be defined as a session with a digital assistant or other interactive application in which a user provides input, the digital assistant processes or analyzes the input, and the digital assistant then provides an output responsive to the input. A conversational session may include a single exchange of input and output, referred to herein as a single-turn conversational session, or multiple exchanges of input and output, referred to herein as a multi-turn interaction session. Engaging in the conversational session may include any point during the conversational session, for example, starting the conversational session, processing input received from a user, providing output, and the like.

In one embodiment engaging in the conversational session may include receiving an indication to begin a conversational session. In an embodiment, the indication to begin a conversational session may be associated with user-provided input. In an embodiment, the user-provided input indication may be a wakeup input or action provided by a user (e.g., one or more wakeup words or predetermined commands, a depression of a button for a predetermined length of time, a selection of a digital assistant icon, etc.). In an embodiment, the wakeup action may be provided prior to or in conjunction with user input. For example, a user may provide the vocal input, "Ok Surlexana, order a pizza." In this scenario, "Ok Surlexana" is the wakeup word and upon identification of the wakeup word an embodiment may prime the system to listen for additional user input. Responsive to the identification of the wakeup action, an embodiment may initiate a conversational session. In another embodiment, the indication may not be associated with a wakeup action. For example, the system may simply "listen" to the user and determine when the user is providing input directed at the system. The conversational session may then be initiated when the system determines that the user input is directed to the system.

In one embodiment engaging in the conversational session may include receiving a query from a user. The term query is used herein, however, it should be understood that a query may not necessarily include a question. Rather, the query may include a command or other input for processing by the digital assistant. The query may be received immediately after the conversational session has been activated, for example, using the pizza example mentioned above, the query ("order a pizza") is received after receipt of the activation command. Alternatively, the query may be received at another point in the conversational session, for example, in response to output provided by the digital assistant.

During the conversational session, an embodiment may receive user input (e.g., voice input, touch input, etc.) including or associated with a user query or a user command, referred to herein as a query input, at a device (e.g., smart phone, smart speaker, tablet, laptop computer, etc.). In an embodiment, the device may employ digital assistant software capable of receiving and processing user input and subsequently providing output (e.g., audible output, textual output, visual output, etc.) corresponding or responsive to the user input. In an embodiment, the user input may be any input that requests the digital assistant to provide a response. For example, the user may ask the digital assistant a general question about a topic, the user may ask the digital assistant to provide instructions to assemble an object, the user may ask the digital assistant's opinion on a topic, the user may make a statement which allows a response, and the like.

The input may be received at an input device (e.g., physical keyboard, on-screen keyboard, audio capture device, image capture device, video capture device, etc.) and may be provided by any known method of providing input to an electronic device (e.g., touch input, text input, voice input, etc.). For simplicity purposes, the majority of the discussion herein will involve voice input that may be received at an input device (e.g., a microphone, a speech capture device, etc.) operatively coupled to a speech recognition device. However, it should be understood that generally any form of user input may be utilized. For example, the user may provide text input to the digital assistant, for example, through a chat assistant or instant messaging application.

In an embodiment, the input device may be an input device integral to the digital assistant device. For example, a smart phone may be disposed with a microphone capable of receiving voice input data. Alternatively, the input device may be disposed on another device and may transmit received input data to the digital assistant device. For example, voice input may be received at a smart speaker that may subsequently transmit the voice data to another device (e.g., to a user's smartphone for processing, etc.). Input data may be communicated from other sources to the digital assistant device via a wireless connection (e.g., using a BLUETOOTH connection, near field communication (NFC), wireless connection techniques, etc.), a wired connection (e.g., the device is coupled to another device or source, etc.), through a connected data storage system (e.g., via cloud storage, remote storage, local storage, network storage, etc.), and the like.

In an embodiment, the input device may be configured to continuously receive input data by maintaining the input device in an active state. The input device may, for example, continuously detect input data even when other sensors (e.g., cameras, light sensors, speakers, other microphones, etc.) associated with the digital assistant device are inactive. Alternatively, the input device may remain in an active state for a predetermined amount of time (e.g., 30 minutes, 1 hour, 2 hours, etc.). Subsequent to not receiving any input data during this predetermined time window, an embodiment may switch the input device to a power off state. The predetermined time window may be preconfigured by a manufacturer or, alternatively, may be configured and set by one or more users.

Engagement in the conversational session may also include an action by the digital assistant. For example, engagement in the conversational session may include the digital assistant processing the input (e.g., accessing a database for an answer, parsing the input to identify the request, etc.), providing output responsive to the input (e.g., asking a successive question, providing audible output answering a provided question, providing audible output indicating a problem with responding, etc.), performing a function associated with the input (e.g., dimming the lights in response to a corresponding request, ordering a pizza in response to a corresponding request, providing a responsive output to a corresponding request, etc.), and the like. In other words, engagement in the conversational session includes any point in which a conversational session is ongoing between the user and digital assistant, even if no input or output is being provided at that exact moment.

At 302 an embodiment may determine whether an input from a source other than the user has been received during the conversational session. For example, an embodiment may determine whether the conversational session has been interrupted by at least one other user or source. Receiving input from a source other than the user may include receiving input from a variety of sources or detecting the input using a variety of techniques. One embodiment may receive an input associated with another person entering the same room as the user. This may signal to an embodiment that an interruption of the conversational session may be imminent. Determining if another person has entered the room may be performed using one or more sensors or devices integral to or accessible by the device (e.g., image capture device, thermopile sensors, near field communication device, microphone, audio capture device, etc.). For example, one embodiment may use a thermopile sensor to detect a heat signature or heat source. The device may determine that there is more than one heat source, one heat source has recently appeared, or the like, to determine that a person has entered the room or another person is present within the room. The device may use heat signature techniques to distinguish between people, pets, plants, and other heat generating sources.

As another example, an embodiment may use an image capture device (e.g., camera, video recorder, infrared sensors, etc.) to detect that another person has entered the area. One embodiment may use radio signatures/signals or near field communication signals (e.g., Bluetooth®, wireless network signals, MAC addresses, etc.) to determine that another person has entered the range of the device. As an example, an embodiment may detect wireless signals from a user's mobile device. Upon detection of a second wireless signal, an embodiment may determine that another person has entered the same space. One embodiment may associate the radio signatures or near field communication signals to a particular user. For example, an embodiment may compare the signal to known signals and determine that the device belongs to User A. Upon detection of a second signal, an embodiment may compare the second signal to known signals and determine that the device belongs to User B. Alternatively, if the signals are not found to match a known signal an embodiment may assume that the signal belongs to another user. Identification of the user associated with a signal may allow an embodiment to distinguish whether it is the same user with more than one device or different users.

An embodiment may use sensors or devices in conjunction with other techniques to receive an input or detect an interruption. As an example, an embodiment may use an audio capture device to detect input provided by one or more users. An embodiment may then use a technique to distinguish users or determine if the input is being provided to the device. For example, an embodiment may use voice identification or other techniques to identify the user providing the input and determine that the user providing the input is not the same user who was previously providing input.

Alternatively, an embodiment may use voice identification or other voice differentiation techniques to determine that input has been provided by more than one user. As an example, the system may identify characteristics of the input (e.g., pitch, frequency, volume, etc.) and determine that the characteristics associated with each input do not match each other. Thus, the embodiment may determine that more than one user has provided input.

One embodiment may use sound source localization techniques to determine the location or direction of the user input. An embodiment may then use this information to determine if a new user has entered the room or provided the input. As an example, an embodiment may determine that the user providing the conversational session input is located at one spot in the room and the new input has been provided at a new location in the room. Other techniques are possible and contemplated, for example, diarization techniques, signal processing techniques, blind source separation techniques, and the like.

One embodiment may use natural language processing or understanding techniques to process and analyze the input to determine if the input is likely being provided to the assistant or another user. For example, an embodiment may analyze the input to determine that the new input provided is unrelated to the first input, for example, the new input includes a different topic, the new input is non sequitur in relation to the first input, and the like. To make this determination that the new input is unrelated to the first input, an embodiment may use different speech or natural language processing techniques, for example, domain classification, intent mapping, dialog act recognition, and the like. An embodiment may use natural language processing or understand to determine that the new input is not input likely to be provided to a digital assistant. For example, an embodiment may determine that the input "Mom, what's for dinner?" is not a request that the digital assistant could process and provide output in response to. Alternatively, an embodiment may understand that the term "Mom" is a term that indicates that the input is directed at an individual and not the digital assistant.

An embodiment may receive an input related to an event that may precede an interruption or give an indication that an interruption may be coming. For example, an embodiment may determine that notifications or communications may indicate that the conversational session may be interrupted. Examples of notifications or communications may include sound-based notifications other than on the device (e.g., doorbell, telephone ring, etc.), incoming communications or notifications on the device or coupled devices (e.g., text message, calendar notification, instant message, alarm notification, etc.), communications or notifications sent from another device (e.g., smart home doorbell, smart home thermostat notification, alarm, etc.), or the like. In other words, events may be detected by the device that may be associated with a possible interruption or that generally lead to an interruption. Any combination of the above techniques, sensors, and/or devices may be used by an embodiment to detect an interruption to the conversational session.

If the conversational session has not been interrupted at 302, an embodiment may continue the conversational session at 304 in a traditional manner. If, however, the conversational session has been interrupted at 302, an embodiment may perform an action related to the conversational session in response to the received input at 303. In response to receipt of the input or detection of the interruption an embodiment may use the contextual information related to the input or interruption to perform an action. In other words, depending on the type or manner of input or interruption, an embodiment may perform different actions. Possible actions include, but are not limited to, pausing or halting the conversational session, wait for the additional person to begin talking, adjusting a characteristic of the output (e.g., lowering the volume of provided output, speeding up the output, slowing the output, etc.), wait for the user to provide additional input (e.g., say "continue", say "go on", provide a resume gesture, etc.), save the current conversational session to be resumed later, and the like.

In the case where an embodiment saves the current conversational session to be resumed later, an embodiment may provide techniques for resuming the conversational session. A user may request that the conversational session be resumed by providing input indicating the conversational session should be resumed, for example, providing the input "Where were we?", providing the input "please resume", or the like. One embodiment may prompt the user to resume a session. For example, when the user is either alone or activates the device again, the device may indicate that a session has been saved and ask if it should be resumed.

One embodiment may save all the conversational sessions and maintain a list or database of the unfinished conversations. Each session in the list or database may be associated with information for retrieval at a later time. For example, the session may include an indication of the topic of the conversation, a user associated with the conversational session, a time associated with the conversational session, and the like. This may allow an embodiment to either search for the conversational session based upon a request by a user to continue the session. Alternatively, an embodiment may prompt the user to continue the session once an embodiment identifies the user as having a previously saved conversational session.

The action performed may be chosen based upon the context of either the input or interruption or the context of the conversational session. For example, if the interruption is a short interruption, providing by a particular person, or the like, an embodiment may perform one action, whereas if the interruption is long, provided by a different person, or the like, an embodiment may perform a different action. As another example, if the conversational session is related to providing a weather forecast, an embodiment may perform one action, whereas if the conversational session is related to a reading a bank statement, an embodiment may perform a different action.

The action performed may be previously programmed, set by a user, based upon the user providing the input, or learned by the device. For example, the device may perform one action in response to a particular type of interruption for one user, and a different action in response to the same type of interruption for another user. Learning an action in response to an interruption may include the device associating an action with a particular context, interruption, or user. For example, the device may determine that a user prefers that one action be performed when an interruption is short and may therefore learn and store this action and perform it when the interruption is short. The action performed may also be determined based upon the emotional state of the user. For example, if the user is annoyed, an embodiment may determine that no output should be provided and the conversation should be saved for later. However, if the user is happy or neutral, an embodiment may provide output and indicate that the conversational session will be saved for later and then save the conversational session.

The various embodiments described herein thus represent a technical improvement to conventional communications with a digital assistant. Using the methods and systems as described herein, the digital assistant can recognize and respond to input and/or interruptions received during a conversational session in a manner similar to how a person would recognize and respond to an input or interruption. Rather than merely processing any input during an activated conversational session, the device can recognize that some input may not be directed at the device and may perform some action with regard to the conversational session in response to this extra input. Such techniques provide a more intuitive digital assistant that can recognize and respond to an interruption of the conversational session.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
engaging, at an information handling device, in a conversational session with a user;
detecting, during engagement of the conversational session, an input from a source other than the user and the source being external to the information handling device, the input comprising an interruption of the conversational session between the information handling device and the user by the source other than the user, wherein the input is directed to the user instead of the information handling device, wherein the detecting comprises detecting, using one or more sensors, another user has entered an environment including the user, wherein the detecting another user is based at least in part on detecting a device signal associated with the detecting another user other than the user;
detecting, using at least one sensor associated with the information handling device, an emotional state of the user; and
performing, at the information handling device, an action related to the conversational session in response to the detected input, wherein the action is dependent on the detected emotional state;
wherein the performing comprises:
withholding output and saving a state of the conversational session responsive to detecting that the emotional state of the user is negative, wherein the saving comprises maintaining a database containing an unfinished conversational session; and
providing the output responsive to detecting that the emotional state of the user is positive.

2. The method of claim 1, wherein the engaging in a conversational session comprises receiving a query from the user.

3. The method of claim 1, wherein the engaging in a conversational session comprises providing output responsive to a query received from the user.

4. The method of claim 1, wherein the detecting an input comprises receiving an input from one or more devices selected from a group consisting of: thermopile sensor, image capture device, radio receiver, audio capture device, and operatively coupled information handling device.

5. The method of claim 1, wherein the detecting an input comprises detecting audible input unrelated to the conversational session.

6. The method of claim 1, wherein the action comprises halting the conversational session.

7. The method of claim 1, wherein the action comprises adjusting an audible characteristic associated with the conversational session.

8. An information handling device, comprising:
a processor;
a memory device that stores instructions executable by the processor to:
engage, at the information handling device, in a conversational session with a user;
detect, during engagement of the conversational session, an input from a source other than the user and the source being external to the information handling device, the input comprising an interruption of the conversational session between the information handling device and the user by the source other than the user, wherein the input is directed to the user instead of the information handling device, wherein the detecting comprises detecting, using one or more sensors, another user has entered an environment including the user, wherein the detecting another user is based at least in part on detecting a device signal associated with the detecting another user other than the user;
detecting, using at least one sensor associated with the information handling device, an emotional state of the user; and
perform, at the information handling device, an action in related to the conversational session in response to the detected input, wherein the action is dependent on the detected emotional state;
wherein the performing comprises:
withholding output and saving a state of the conversational session responsive to detecting that the emotional state of the user is negative, wherein the saving comprises maintaining a database containing an unfinished conversational session; and
providing the output responsive to detecting that the emotional state of the user is positive.

9. The information handling device of claim 8, wherein the instructions executable by the processor to engage in a conversational session comprise instructions executable by the processor to receive a query from the user.

10. The information handling device of claim 8, wherein the instructions executable by the processor to engage in a conversational session comprise instructions executable by the processor to provide output responsive to a query received from the user.

11. The information handling device of claim 8, wherein the instructions executable by the processor to detect an input comprises instructions executable by the processor to receive an input from one or more devices selected from a group consisting of: thermopile sensor, image capture device, radio receiver, audio capture device, and operatively coupled information handling device.

12. The information handling device of claim 8, wherein the instructions executable by the processor to detect an input comprises instructions executable by the processor to detect audible input unrelated to the conversational session.

13. The information handling device of claim 8, wherein the action comprises instructions executable by the processor to halt the conversational session.

14. The information handling device of claim 8, wherein the action comprises instructions executable by the processor to adjust an audible characteristic associated with the conversational session.

15. A product, comprising:
- a storage device that stores code, the code being executable by a processor and comprising:
- code that engages in a conversational session with a user in an area;
- code that receives, during engagement of the conversational session, an input from a source other than the user and the source being external to the information handling device, the input comprising an interruption of the conversational session between the information handling device and the user by the source other than the user, wherein the input is directed to the user instead of the information handling device, wherein the detecting comprises detecting, using one or more sensors, another user has entered an environment including the user, wherein the detecting another user is based at least in part on detecting a device signal associated with the detecting another user other than the user;
- code that detects an emotional state of the user; and
- code that performs an action related to the conversational session in response to the received input, wherein the action is dependent on the detected emotional state;
- wherein the performing comprises:
- withholding output and saving a state of the conversational session responsive to detecting that the emotional state of the user is negative, wherein the saving comprises maintaining a database containing an unfinished conversational session; and
- providing the output responsive to detecting that the emotional state of the user is positive.

\* \* \* \* \*